United States Patent [19]

Kubo et al.

[11] 3,864,724

[45] Feb. 4, 1975

[54] TARGET STRUCTURE FOR SINGLE TUBE TYPE COLOR TELEVISION CAMERAS

[75] Inventors: Shuji Kubo; Yoshio Ando, both of Kawasaki, Japan

[73] Assignee: Matsushita Electric Industrial Company, Limited, Osaka, Japan

[22] Filed: Oct. 10, 1973

[21] Appl. No.: 405,097

[30] Foreign Application Priority Data

Oct. 11, 1972 Japan .............................. 47-102126
Sept. 25, 1973 Japan .............................. 48-108171

[52] U.S. Cl. .................... 357/31, 313/368, 313/386, 357/90

[51] Int. Cl. ............................................ H01j 31/26

[58] Field of Search ............ 313/65 AB, 65 T, 65 A, 313/66, 89; 317/235 NA

[56] References Cited

UNITED STATES PATENTS

| | | | |
|---|---|---|---|
| 3,617,753 | 11/1971 | Kato et al. | 317/235 N |
| 3,633,077 | 1/1972 | Tsuji et al. | 317/235 R |

*Primary Examiner*—James B. Mullins

[57] ABSTRACT

For direct separation of primary colors of an imaged scene to be televised, a silicon target structure has on the light-receiving surface thereof an array of groups of picture elements doped with donor and acceptor impurities to give specific sensitivities to the incident light. On the electron-beam surface thereof an array of p-n junctions is formed in correspondence with the array on the light-receiving surface. Minority carriers induced by the shorter wavelength range of the spectrum are repelled by the increasing potential gradient established by the donor impurity and diffuses towards the nearest p-n junction together with other carriers caused by the medium and longer wavelength range of the spectrum. Minority carriers induced by the shorter and medium wavelength range of the spectrum are attracted by the decreasing potential gradient established by the acceptor impurities causing the remaining portions of the carriers to diffuse towards the nearest junctions.

8 Claims, 6 Drawing Figures

TARGET STRUCTURE FOR SINGLE TUBE TYPE COLOR TELEVISION CAMERAS

This invention relates generally to target structures for color television camera tubes, and particularly to a target structure for a single-tube type color television camera.

A single-tube type color television camera known in the art utilizes a color strip filter comprising recurrent groups of color strip filters alternately arranged in succession. The color filter is placed in front of a target, usually of a photoconductive array of p-n junctions, and which by the electron beam scanning, generates signals corresponding to the color image formed on the target. However, difficulty has been experienced in fabricating the color filter with a precision of considerably higher degree. Furthermore, the provision of a color filter inevitably results in a loss of light.

Accordingly, an object of the present invention is to provide a target structure which eliminates the use of a color filter.

Another object of the present invention is to provide a target structure which permits direct separation of colors in a single camera tube.

A further object of the present invention is to provide a target structure which permits it to be fabricated on integrated circuits for mass-production.

Briefly described, the present invention contemplates the direct separation of colors by controlling the movement of the minority carriers generated by the incident optical image. In carrying out this objective, there is provided a target structure which comprises an n-type silicon wafer and an array of groups of triplet impurity-doped regions or picture elements on the light-receiving surface of the wafer. On the electron beam side of the wafer, an array of p-type regions are deposited in the usual manner of forming p-n junctions in opposed relationship with the picture elements. It has been found that light penetrates a silicon wafer to a depth determined by the particular wavelength range and thus the depth of regions where electron-hole pairs are generated depends on the silicon absorption characteristic. At the 90 percent light absorption of the silicon wafer, the shorter, or blue light region of the spectrum penetrates to a depth of about 1.0 $\mu$the medium, or green light region of the spectrum penetrates to a depth of about 3.5 $\mu$m and the longer, or red light region penetrates to a depth of about 7.5 $\mu$m. Therefore, the blue light induces carriers from the surface to a 1 $\mu$m depth, the green light induces carriers from the surface to a 3.5 $\mu$m depth and the red light to a 7.5 $\mu$m depth. In accordance with one form of the present invention, each of the triplet picture elements is doped with impurities to impart it particular spectral sensitivity. The first picture element is doped with a donor impurity at a concentration of $5 \times 10^{19}$ to $1 \times 10^{20}$ atoms/cm$^3$ to a depth of 0.1 to 0.3 $\mu$m from the surface, the second picture element has a carrier concentration of $1 \times 10^{14}$ to $1 \times 10^{15}$ atoms/cm$^3$ as that of the silicon wafer. The second picture element may preferably be doped with acceptor impurity at a concentration of $1 \times 10^{20}$ to $9 \times 10^{20}$ atoms/cm$^3$ to a depth of 0.1 to 0.5 $\mu$m and the third region is doped with an acceptor impurity at a concentration of $1 \times 10^{20}$ to $9 \times 10^{20}$ atoms/cm$^3$ to a depth of 1 to 5 $\mu$m. Since the first picture element is doped with donor impurity, the carriers generated in the immediate surface area are caused to diffuse towards the opposite (electron beam side of the wafer) surface by the repelling action of the donor impurity. Therefore, the first picture element is rendered sensitive to the full wavelength range of the spectrum. In the second picture element, on the other hand, the carriers generated in the immediate surface area are caused to diffuse towards the light-receiving surface by the attracting force of the acceptor impurity and only that portion of carriers which is generated by the impact of the medium to longer (green and red light) wavelength range of the spectrum diffuses towards the electron-beam side. Therefore, the second picture element is rendered sensitive to the green and red light. Since the third picture element has a greater diffusion depth than that of the second region, that portion of carriers which has been induced by the green light is attracted by the acceptor impurity and only that remaining portion of carriers which is caused by the red light range of the spectrum is caused to diffuse towards the electron beam side of the wafer. Equivalent electrical signals can be obtained when the electron-beam side of the wafer is scanned by a constant intensity electron beam. The electrical signals are processed by an arithmetic (subtracting) circuity to provide individual color components of the primary colors.

These and other features of the present invention will be better understood from the following description taken in conjunction with the accompanying drawings, in which.

Figures 3A, 3B, 3C:
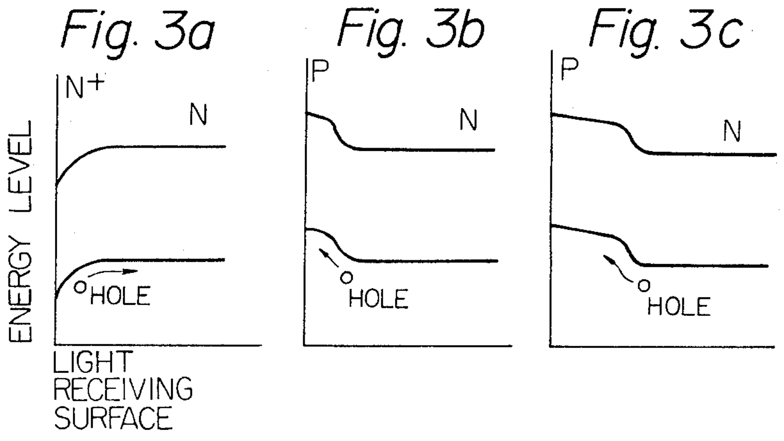
Figure 4:
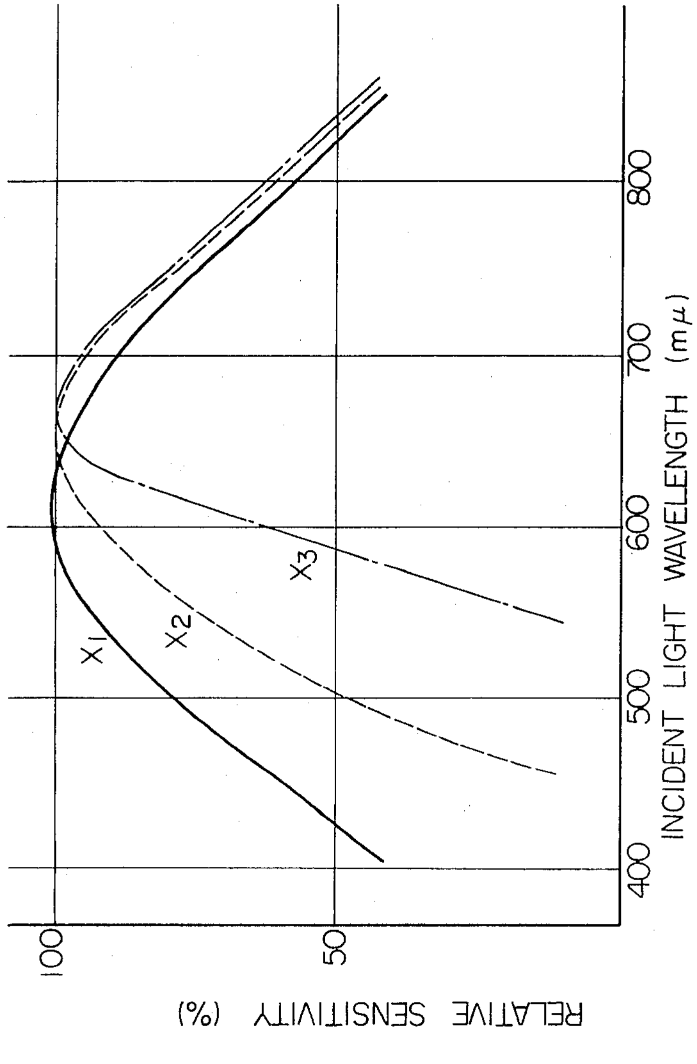

FIGS. 3*a* to 3*c* are graphs showing various energy levels useful for describing the present invention; and FIG. 4 is a graph showing relative sensitivity to incident light as plotted against the wavelength.

Figures 1, 2:
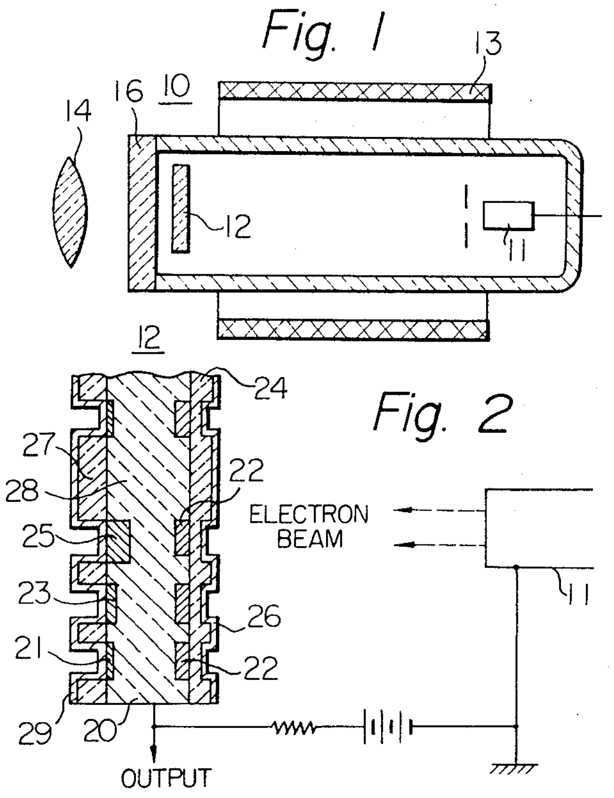
FIG. 1 is a color television camera tube to which a target structure in accordance with the present invention is applicable.
FIG. 2 is a fragmentary cross-sectional view of the target structure.

Referring now to the drawings, particularly to FIG. 1 in which the camera tube 10 is similar in every respect to the typical vidicon camera tube used in television systems except for the characteristics of the target 12. The camera tube illustratively includes a lens 14 for imaging a scene through the transparent faceplate 16 upon one surface of the target 12. The tube includes a cathode 11 and focussing and deflecting coil 13.

With reference to FIG. 2, it may be seen that the target 12 comprises an *n*-type silicon wafer 20 with a thickness of 15 microns and a specific resistivity of 5 ohm-centimeters into which *p*-type conductivity regions 22 have been diffused through a regular array of holes in a silicon dioxide insulating layer 24 as provided in the usual manner of the diffusion technique. The silicon wafer 20 may have a specific resistivity of from 5 to 10 ohm-centimeters which correspond to concentrations of $1 \times 10^{15}$ and $1 \times 10^{14}$ atoms/cm$^3$, respectively. This entire surface is covered with a semi-insulating, or resistive layer 26. The wafer 20 includes an array of picture elements 21, 23 and 25. The picture element 21 is doped with donor impurity by diffusing phosphorus to a depth of from 0.1 to 0.3 $\mu$m, preferably from 0.1 to 0.2 $\mu$m at an impurity concentration of from $5 \times 10^{19}$ to $1 \times 10^{20}$ atoms/cm$^3$. The picture element 23 has the same carrier concentration as that of the silicon wafer, but, preferably it may be doped with an acceptor impurity by diffusing boron at a concentration of $1 \times 10^{20}$ to $9 \times 10^{20}$ atoms/cm$^3$ to a depth of 0.1 to 0.5 $\mu$m, preferably, 0.1 to 0.3 μm. The picture element 25 is doped with an acceptor impurity by diffusion of boron at a concentration of $1 \times 10^{20}$ to $9 \times 10^{20}$ atoms/cm$^3$ to a depth of 1 to 5 μm, preferably, 1 to 3 μm. The picture elements 21, 23 and 25 constitute a single group of elemental regions and occur in succession across the entire surface of the light-receiving side of the wafer 20. These groups of picture elements are preferably separated by an index region 28 so that the individual picture elements of one group can be discriminated from another. The picture elements 21, 23 and 25 may advantageously be either dot shaped or in the form of a strip extending in a direction perpendicular to the direction of electron beam scanning. The region 22 on the electron beam side of the wafer 20 may be dot shaped. It will be understood that the arrangement of the both arrays of regions on the opposite sides of the wafer 20 should be in correspondence with each other so that the electrical signals generated by the impact of electron beam are an exact replica of the optical image incident on the light receiving side of the target 12. Furthermore, the diameter of the reading electron beam must be slightly larger than the diameter or the width of the region 22 depending on the shape of the region 22.

Character 27 is a silicon dioxide layer which overlays the remaining surface portions of the wafer. The entire surface of the target 12 is coated with an anti-reflecting layer 29. The layer 29 comprises a phosphorus silicate glass layer sandwiched between layers of silicon dioxide. The phosphorus silicate layer serves to prevent contamination by potassium ions. The layer 29 has a thickness of about 2,400 A.

When an optical image is formed by the lens 14 through the face plate 16 onto the light-receiving surface of the target 12, minority carriers are generated under the surface area of the wafer 20. In the picture element 21, the minority carriers induced by the shorter or blue light region of the spectrum in the immediate surface area diffuses towards the electron beam side of the target due to the repelling action of the donor impurity. In more detail, the donor impurity doped region 21 provides an impurity concentration gradient which raises the energy level as shown in FIG. 3*a* and causes a lowering of surface recombination velocity by repelling the minority carriers from the light-receiving surface, thereby causing them to diffuse towards the nearest p-n junction, or region 22. Since the surface recombination velocity is greater in the immediate surface area than in the deeper regions, the shallow doping of donor impurity prevents loss of carriers due to surface recombination. That remaining portion of the carriers which has been induced by the medium and longer wavelength range also diffuses towards the nearest junction, so that all the minority carriers generated by the full wavelength range of the spectrum can be retrieved from the nearest junction by impingement of the electron beam. The picture element 23, if doped with an acceptor impurity, causes a raising of the energy level as shown in FIG. 3*b* and attracts the minority carrier induced by the shorter wavelength range towards the light-receiving surface, thereby causing them to recombine with the recombination centers existing in the immediate surface area. Otherwise, the picture elements 23 provides a flat surface energy level. In this case, a surface recombination occurs and a loss of carriers induced by the shorter wavelength range results. The remaining portion of the carriers diffuses towards the nearest junction, so that only that portion of the carriers which has been induced by the medium to longer wavelength range of the spectrum (green and red light) contributes to the generation of electrical signal which corresponds to the green and red light components of the imaged picture. The picture element 25 provides the same impurity concentration as that of the picture element 23, but differs in that its impurity diffusion depth is greater than the depth of the impurity doped in the picture element 23. This results in the energy level starting to rise at a deeper region as shown in FIG. 3*c*. The greater diffusion depth of the element 25 provides the same phenomenon as described in connection with the picture element 23, but differs in that the minority carriers induced by the medium, or green light portion of the spectrum are attracted towards the light-receiving surface and recombine with the recombination centers, so that only that portion of the carriers which has been caused by the longer wavelength of the spectrum, or the red light region diffuses towards the nearest junction, thereby contributing to the generation of electrical signal of red light component.

Equivalent electrical signals generated by impingement of the electron beam across the electron beam side of the target 12 are represented by characteristic curves $X_1$, $X_2$ and $X_3$ in FIG. 4. These curves can be expressed by the following Equations (1) (2) and (3):

$$X_1 = B + G + R \quad (1)$$

$$X_2 = G + R \quad (2)$$

$$X_3 = R \quad (3)$$

where, $B$, $G$ and $R$ represent blue, green and red light, respectively. Rearranging these equations, we can obtain the individual color components from the following relations:

$$B = X_1 - X_2 \quad (4)$$

$$G = X_2 - X_3 \quad (5)$$

$$R = X_3 \quad (6)$$

As will be seen from Equations (4) to (6), the blue light component can be obtained by subtracting electrical signal $X_2$ of the picture element 23 from electrical signal $X_1$ of the picture element 21, the green light component by subtracting signal $X_3$ of the picture element 25 from signal $X_2$, and the red light is directly obtained from $X_3$. These signals are processed in an arithmetic (substracting) circuitry such as, for example, differential amplifiers.

The individual picture elements can be doped with specific impurities to give particular sensitivity to light. Since the doping can be made by conventional doping or diffusion technique, the present invention permits target structures to be fabricated on integrated circuits.

The foregoing description shows only preferred embodiments of the present invention. Various modifications are apparent to those skilled in the art without departing from the scope of the present invention which is only limited by the appended claims. Therefore, the embodiments shown and described are only illustrative, not restrictive.

What is claimed is:

1. A target structure for a color television camera tube, comprising:

a semiconductive substrate of one conductivity type having first and second opposed surfaces for transmitting to said first surface an optical image incident on said second surface;

a first array of regions of the opposite conductivity type on said first surface; and a second array of groups of first, second and third regions on said second surface in correspondence with said first array of regions, said first region being doped with an impurity of said one conductivity type at a first concentration to a first depth for generating carriers in response to the full visible spectrum range, said second region having a carrier concentration equal to that of said substrate for generating carriers in response to the medium to longer wavelength range of the spectrum, and said third region being doped with an impurity of said opposite conductivity type at a second concentration to a second depth for generating carriers in response to the longer wavelength range of the spectrum.

2. A target structure as claimed in claim 1, wherein said first concentration is $5 \times 10^{19}$ to $1 \times 10^{20}$ atoms/cm$^3$, said first depth is 0.1 to 0.3 $\mu$m said second concentration is $1 \times 10^{20}$ to $9 \times 10^{20}$ atoms/cm$^3$ and, said second depth is 1 to 5 $\mu$m.

3. A target structure as claimed in claim 1, wherein said second regions is doped with an acceptor at a concentration of $1 \times 10^{20}$ to $9 \times 10^{20}$ atoms/cm$^3$ to a depth of from 0.1 to 0.5 $\mu$m from said second surface.

4. A target structure as claimed in claim 1, wherein said substrate is silicon.

5. A target structure as claimed in claim 1, wherein said second surface is overlayed with an anti-reflecting layer.

6. A target structure as claimed in claim 5, wherein said anti-reflecting layer comprises a first layer of silicon dioxide on said second surface, a second layer of phosphorus silicate glass on said first layer and a third layer of silicon dioxide on said second layer.

7. A target structure as claimed in claim 5, wherein said anti-reflecting layer has a thickness of about 2,400 A.

8. A target structure as claimed in claim 1, wherein said groups of regions are separated by an index region to allow discrimination of said groups from one another.

* * * * *